(No Model.)

C. W. BROOKS.
CARRIAGE AXLE.

No. 505,387. Patented Sept. 19, 1893.

Witnesses
John Strough
Mary Brooks

Charles W. Brooks, Inventor
By his Attorney D. E. Frost

UNITED STATES PATENT OFFICE.

CHARLES W. BROOKS, OF STEVENS POINT, WISCONSIN.

CARRIAGE-AXLE.

SPECIFICATION forming part of Letters Patent No. 505,387, dated September 19, 1893.

Application filed October 24, 1892. Serial No. 449,886. (No model.)

*To all whom it may concern:*

Be it known that I, CHARLES W. BROOKS, a citizen of the United States, residing at the city of Stevens Point, in the county of Portage and State of Wisconsin, have invented a new and useful Self-Lubricating Dust-Proof Carriage and Wagon Axle, of which the following is a specification.

My invention relates to carriage and wagon axles, and the objects of my invention are, first, to provide a continuously lubricated bearing for the axle; second, to make the same dust proof; third, to secure strength by means of a true taper of spindle at the points where the bearings come; fourth, to combine durability with cheapness of construction; fifth, to secure simplicity of construction between the wheel and the axle. I attain these objects by the mechanism illustrated in the accompanying drawings, in which—

Figure 1:
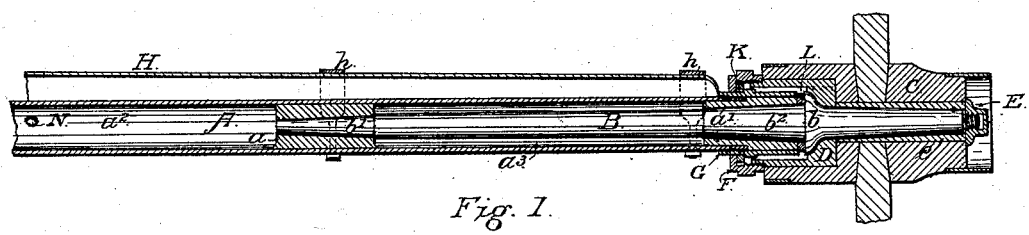
Figure 4:
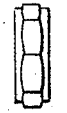
Figure 5:
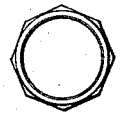
Figure 2:
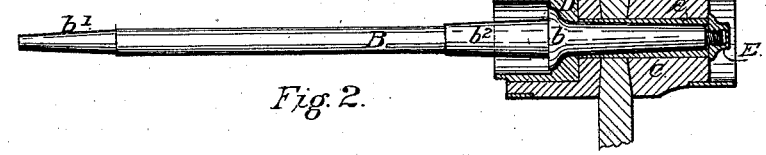
Figure 6:
Figure 3:
Figure 7:
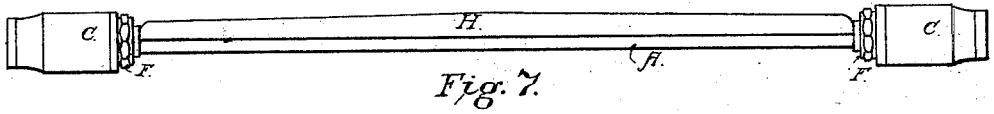

Figure 1 is a longitudinal section of one-half of the complete axle. Fig. 2 is a longitudinal section of one wheel hub with the spindle or revolving axle in place. Fig. 3 is a longitudinal section of one half of the hollow or bearing axle. Figs. 4 and 5 show the coupling nut. Fig. 6 is an outside view of the sleeve. Fig. 7 shows the complete axle.

Like letters indicate like parts throughout the several views.

The axle proper is made of three pieces: The central portion A, is a hollow cylinder, held stationary to the vehicle and arranged to form the bearings for the spindle or revolving axle B. The hub C is recessed from the inside to receive the cup D, which is driven to place.

$c$ is a lining of Babbitt or other composition run into the wheel hub, to form a perfect bearing for the conical end of the spindle B. When the spindle B is inserted in the wheel hub and nut E tightened up, the collar $b$ finds a bearing against the cup D, while the stem perfectly fits the Babbitt lining, and by this means wheel and spindle are united and made as one piece.

Over each end of the axle A is slipped the nut F. The sleeve G is then screwed to the end of A, or if desired sleeve G might be made fast to the axle by being pressed on or by brazing, or in other suitable manner.

Within the sleeve G and axle A at $a$ and $a'$ are linings of Babbitt, or other suitable alloy, run in to form bearings for the journals $b'$ and $b^2$ of the spindle.

H is the bed piece secured to the axle by U bolts $h$. The bed piece and axle A are secured to the vehicle by any of the customary ways. Having secured the axle A and its fittings to the vehicle, to mount it upon its wheels, the revolving spindle B secured in wheel is now slipped into the hollow axle A, and nut F screwed upon the projecting end of cup D, which is threaded to receive the same. As will be seen by this arrangement spindle B with wheel attached, is now free to revolve within the bearings $a$ and $a'$, but cannot be disengaged.

The central portion of the axle at $a^2$, and around the spindle at $a^3$, forms an oil chamber, so, that the axle constantly revolves in the lubricant, and is thus self-oiling and capable of going for a long time without attention. The washers K and L prevent the lubricant from leaking out or dust or grit of any kind from getting at the bearings. N is a plug through the axle where the lubricant is supplied. As will be apparent by this arrangement the wear of spindles and bearings is reduced to a minimum; however if at any time from any reason, bearings become faulty, all that is necessary is to melt out the old bearings and re-babbitt them; thus, without any renewal of parts whatever, bearings will be made perfect.

What I claim as my invention, and desire to secure by Letters Patent, is—

1. The combination of sleeve G with the axle A, and Babbitt, or other alloy bearing, uniting G and A.

2. In combination with a tubular axle and sleeve which are adapted to be connected, the axle and sleeve having bearings $a$ and $a'$, of a spindle B having tapered portions $b'$ and $b^2$ for engagement with the bearings, a hub rigidly attached to the outer end of the spindle, and means for connecting the hub and spindle together, substantially as shown.

3. In combination with a tubular axle having a bearing $a$ and threaded end, a sleeve carrying a bearing which is adapted to enter the end of the axle, said sleeve having a threaded end and an outwardly extending circumferential flange, a spindle having conical bearing portions, said spindle being rigidly attached to the hub, the hub having a cup the projecting end of which is threaded, together with a nut which engages with the sleeve and cup so as to connect the parts to each other, substantially as shown, and for for the purpose set forth.

4. A tubular axle having a threaded end and a sleeve G which is adapted to be secured thereto, said sleeve having an external flange and an internal conical bearing $a'$, in combination with a hub C and spindle B which are constructed substantially as shown and are rigidly attached to each other the hub carrying a cup having a threaded projecting portion, and a nut F which encircles the sleeve G and engages with the threaded end of the cup, for the purpose set forth.

5. The combination of nut F and projecting threaded end of cup D, the nut F screwing on to the cup D which is threaded to receive it as before described.

CHARLES W. BROOKS.

Witnesses:
JOHN STUMPF,
MARY BROOKS.